Figures 1, 2:
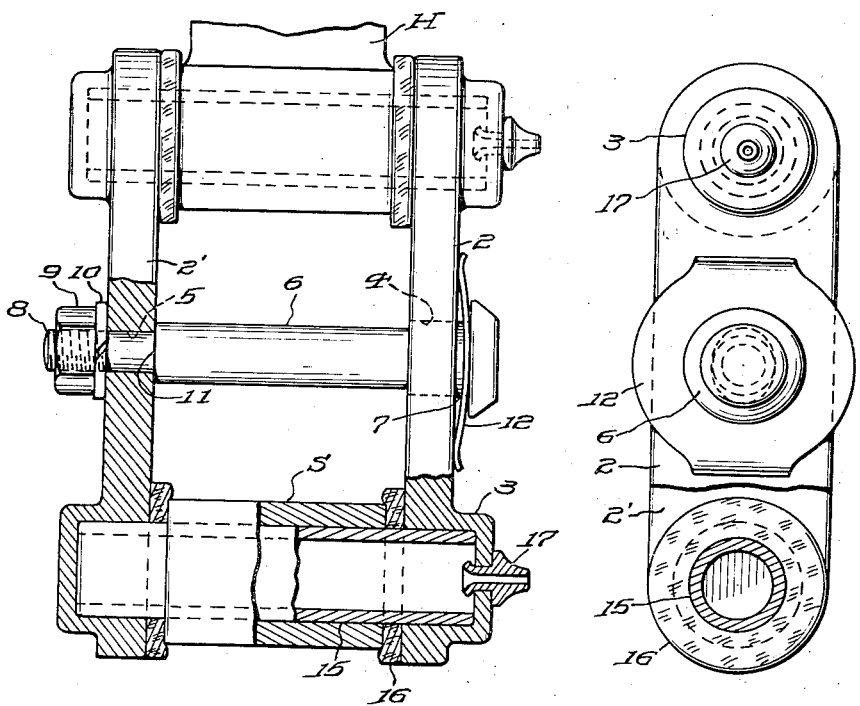

Dec. 29, 1936.  W. A. TRYON  2,065,840

WEAR COMPENSATING SPRING SHACKLE

Filed Nov. 13, 1935

INVENTOR
William A. Tryon

WITNESS

Patented Dec. 29, 1936

2,065,840

UNITED STATES PATENT OFFICE 2,065,840

WEAR COMPENSATING SPRING SHACKLE

William A. Tryon, Elmira, N. Y., assignor to Patent Purchasing Company, Elmira, N. Y., a corporation of Rhode Island Application November 13, 1935, Serial No. 49,443

7 Claims. (Cl. 267—54)

The present invention relates to shackles such as are commonly used for connecting the ends of automobile springs with the frame of the car, either directly or through the medium of suitable hangers secured thereto, so as to afford the requisite capacity for relative movement between the spring and the frame when the car is traveling over a rough or undulating surface.

A principal object of the invention is to provide an improved shackle having independent bearing surfaces for reception respectively of vertical and lateral thrusts and so constructed as to automatically compensate for wear between the relatively moving parts of its lateral thrust bearings to thereby preserve the requisite snugness of fit between them, the vertical thrust bearing surfaces being maintained in snug engagement by the weight of the car, with consequent avoidance of looseness and rattling.

A further object of the invention is the provision of a shackle of this character which presents large areas of contact between relatively movable parts for reception of vertical thrust in supporting the weight of the car with consequent minimization of normal wear therebetween; which is simple in design and construction, may be manufactured at a relatively low cost, and is adapted for installation in place of the shackles commonly employed without requiring any structural changes or redesigning of existing car models so that it may be readily utilized by automotive manufacturers for new cars or as replacements for shackles already on existing cars.

A still further object of the invention is the provision of a wear compensating shackle having bearing surfaces, independent of the vertical thrust or load supporting bearing surfaces, for the reception of lateral thrusts between the spring and the frame, which embodies means for automatically compensating for wear thereof whereby said surfaces are constantly maintained in proper engagement and rattling or noise due to sidesway of the car entirely eliminated.

Another object is to provide a shackle of the character aforesaid which is so constructed as to afford lubricant reservoirs of large size which may be packed with grease, heavy oil, or other suitable lubricant at the time of installation in amount sufficient to properly and automatically lubricate the wearing parts of the shackle throughout a long period of use without any attention and thus, in effect, to provide a shackle which is substantially self-lubricating but in which the lubricant can readily be replenished by ordinary means when it eventually becomes necessary.

Another object is the provision of a shackle embodying means for automatically compensating for wear between its lateral thrust bearing surfaces which can be assembled on the car with a minimum of time and effort and without the necessity of making any adjustments, it being only necessary after the parts are brought together to set up a single nut as tightly as possible in order to complete the assembly operation and insure the proper degree of pressure between said surfaces. This feature is of great advantage in that the time required during the assembly of the car on the production line for properly adjusting many of the shackles heretofore in common use is eliminated, while additionally it is substantially impossible for the owner or garage mechanic when subsequently replacing a part of the shackle which has been damaged or otherwise taking it apart and reassembling it on the car to improperly adjust it so that it works too freely or without sufficient freedom with consequent alteration in the riding qualities of the car as initially determined by the maker.

Still another object of the invention is to provide a shackle having means for automatically compensating for wear incident to lateral thrust which is so designed that even if the lubricant initially supplied is not replenished after it is expended and the shackle thus allowed to run dry, it will nevertheless operate satisfactorily and without excessive wear for long periods due to the fact that the load bearing surfaces are of maximum size and the flat lateral thrust bearing surfaces though under constant yielding compression have much less tendency to bind when dry or improperly lubricated than the conical surfaces heretofore employed in many shackles for sustaining at least a portion of the lateral thrust.

A further object of the invention is to provide a shackle of the character aforesaid comprising packing rings of cork or other suitable material to prevent escape of lubricant from the shackle bearing surfaces, these rings being so disposed and the shackle parts being so arranged that the rings are not subjected to appreciable wear when the shackle is in use and are thus maintained in proper condition for the performance of their intended function for an extended period.

Other objects, advantages and novel features of design, construction and arrangement comprehended by the invention are hereinafter more particularly pointed out or will be readily apparent to those skilled in the art from the following description of a shackle constructed in accordance therewith and illustrated in the accompanying drawing, in which Fig. 1 is a rear elevation of the shackle in operative assembly with a car spring and hanger partially broken away into vertical section, and Fig. 2 is a side elevation of the shackle removed from the car and also partly in vertical section.

The same characters are used to designate corresponding parts in both figures.

The shackle, which is designed to form a connecting medium between two relatively movable members such, for example, as a hanger H attached to the car frame and a spring S only the eye of which is indicated, comprises a pair of side links 2, 2' respectively disposed on opposite sides of the hanger and spring eye which lie in the same vertical plane. These links are substantially identical in construction and each comprises a generally flat plate of metal of sufficient size, shape and thickness to sustain the duty imposed upon it having substantially cylindrical pockets 3 adjacent its opposite ends preferably formed by extruding the metal of the plate substantially in accordance with the practice disclosed in U. S. Letters Patent 2,016,758, issued to me October 8, 1935, although they may be formed in any other suitable way if desired. The link 2 is provided adjacent its center with an oval bolt hole 4, and the link 2' with a circular bolt hole 5 in substantial alignment therewith for the reception of a transversely extending bolt 6 having an elliptical boss 7 beneath its head adapted to enter the hole 4 and prevent the bolt from turning.

The bolt 6 is of reduced diameter adjacent its opposite end thereby providing an externally threaded stem 8 extending through hole 5 in link 2' adapted to receive on its extremity a nut 9 and lock washer 10, the shoulder 11 formed at the junction of stem 8 and the shank of the bolt abutting the inner face of link 2' when the nut 9 is fully set up. A spring 12, preferably of the plate type, interposed between the head of the bolt and the adjacent face of link 2, urges the latter away from the head and thus toward the other link in the assembled shackle, the location of the shoulder with respect to the head being determinative of the spacing of the fixed link 2' from the head of the bolt.

The links are maintained in spaced relation against the influence of spring 12 by hollow cylindrical pins 15, the ends of which fit into the pockets formed at the ends of the links. These pins are respectively rigidly secured by press fit or otherwise in hanger H and spring S with their ends projecting therebeyond and into the link pockets and thus form vertical thrust bearings with the substantially cylindrical side walls of the pockets and lateral thrust bearings with the flat bottoms thereof. Each pin 15 is preferably made from a single piece of tubing of suitable diameter and wall thickness and its end faces and outer surface, or at least the portions thereof designed to enter the link pockets, are smoothly finished to minimize friction with the bearing surfaces of the latter.

For the sake of clearness of illustration, spring 12 is shown in the drawing as outwardly bowed from the movable link 2 to a greater extent than is normally the case in practice, for in accordance with the preferred construction shoulder 11 is so positioned relatively to the bolt head that when nut 9 is fully set up the spring lies almost flat against the outer face of that link, the shoulder of course engaging the inner face of the opposite link 2'. As wear takes place between the end faces of the pins and the bottom of the pockets, a corresponding increase in the curvature or bowing of the spring occurs, but as this wear is very slight during the life of the shackle the change in the condition of the spring after many thousands of miles of use is substantially inappreciable, and a substantially constant pressure is thus exerted by it to force the links toward each other and maintain suitable bearing engagement between the end faces of the pins and the bottoms of the pockets thereby preventing any lost motion or play therebetween and consequent rattling from side sway of the car.

It will of course be appreciated that the pressure between the end faces of the pins and the bottoms of the pockets is determined by the form and strength of the spring and the amount it is compressed after assembly so that by suitably proportioning the parts and utilizing springs of varying strength and design, the said pressure can be adjusted to conform to the requirements of the car manufacturer and, further, once these factors can be determined, it is only necessary in assembling the shackles on the car to be certain that nuts 9 are set up as tightly as possible to produce the same pressure in a plurality of similar shackles with the result that the same riding qualities, insofar as they are controlled by the shackles is concerned, may be readily imparted to all the cars of a given model as they come from the production line.

The open ends of the shackle pins which abut the bottoms of the link pockets, permit gradual seepage of lubricant from the reservoirs in the interior of the pins to the lateral thrust and load supporting bearing surfaces adjacent their ends, and annular cork or other suitable sealing washers 16 are positioned on the pins between the ends of the spring eye S and hanger H respectively and the inner faces of the links. These washers are preferably of such thickness as to be slightly compressed when the shackle is fully assembled, and thus form a tight seal to prevent too rapid escape of the lubricant from the bearing surfaces. A lubricating nipple 17 may be inserted in a suitable hole in the bottom of each pocket of one of the links to permit convenient replenishment of the lubricant in the reservoirs in the pins when required, and the inner ends of the stems of these nipples are preferably burred or slightly headed over after their insertion in the holes to prevent their being forced outwardly by pressure of the lubricant within the shackle or otherwise removed therefrom.

Through the provision of independent vertical and lateral thrust bearing surfaces between the link pockets and the shackle pins, the wear incident to operation of the shackle under these two different types of stress is distributed over separate and distinct areas, and these may be proportioned, by suitable selection of the proper dimensions of the several parts, so that the bearings of both types wear about equally with relation to their respective maximum periods of practical usefulness, the weight and nature of the car being, of course, factors in the wear imposed on the bearings and hence entering into the design of the shackle for any specific type of car.

Moreover, since the lateral thrust bearings formed at the pin ends are always maintained under compression by the spring, which is preferably a fairly heavy one, the end faces of the pins always bear in whole or in part against the bottoms of the pockets even under conditions causing or tending to cause side sway of the car and consequent skewing of the pins relatively to the links, thus preventing the occurrence of noise or side slap between the latter and the said end faces.

Moreover, with this type of shackle rattling or other noise cannot occur because of wear and consequent looseness between the cylindrical ends of the pins and the side walls of the pockets since the vertical thrust of the car body and load, which is received and sustained by these parts, is exerted in a direction to constantly maintain at least a portion of the wall of each pocket and of the adjacent pin in engagement particularly in modern cars having two-way shock absorbers which dampen and modify the oscillation of the springs in both directions. Consequently, while it is of course desirable that the diameters of the pockets and the ends of the pins be initially such as to form a good bearing fit entirely around their peripheries, the fact that in time wear may take place between these bearing surfaces sufficient to cause a certain amount of play or looseness does not result in rattle or other noise when the car is in operation.

As has been observed, the tendency of the links to move toward each other under the influence of spring 12 is positively limited by engagement of the end faces of the pins with the bottoms of the pockets whereby the cork or other oil sealing washers 16 are relieved from any duty of resisting the inward movement of the links and are thus initially compressed only to the extent determined by the design of the shackle. As the end thrust bearings gradually wear, however, this compression may be slightly increased as the links come nearer together but not to an extent sufficient to cause the resilient washers to cut out or disintegrate to any material extent as the parts of the shackle move relatively to each other under operating conditions. It results that the oil seal effected by the washers is therefore maintained for a long period which would not be the case if the washers were required to resist the tendency of the shackles to move together under the force exerted by the spring.

It is evident that the parts of my improved shackle may be constructed at relatively small cost and that proper assembly of the shackles in a car requires merely the suitable positioning of the parts and the single mechanical operation of setting up nut 9 on the bolt so as to bring link 2' into engagement with the bolt shoulder, thus automatically adjusting the spring to the predetermined desired tension and insuring a proper fit of the pins in their bearings, whereby binding of the bearings through too tight an adjustment is rendered substantially impossible. The bolt shoulder thus forms a definite and predetermined limit to the extent to which the nut can be set up and greatly facilitates the rapid assembly of the shackle.

While I have herein described a preferred embodiment of the invention as it may be employed in association with an automobile of a usual type, it will be understood that I do not thereby intend to limit or confine myself thereto in any way, or to any specific use thereof, as the principles of the invention may be readily embodied in shackles and/or wear compensating bearings of other types and/or numerous changes and modifications may be made in the details of design, construction and arrangement of the various elements if desired without departing from the spirit and scope of the invention as defined in the appended claims.

Having thus described my invention, I claim and desire to protect by Letters Patent of the United States:

1. A spring shackle comprising a pair of laterally spaced side links each having a substantially cylindrical pocket adjacent each of its ends, a pair of tubular cylindrical shackle pins each having its ends respectively seated in a pocket in each of the links and engaging the side walls and bottom thereof, a bolt extending between the links and rigidly secured to one of them, and means disposed between the head of the bolt and the other link operative to maintain the pins in assembled relation with the links and yieldingly induce intimate bearing engagement between the bottoms of the pockets and the ends of the pins.

2. A spring shackle comprising a pair of laterally spaced side links each having a substantially cylindrical pocket adjacent each of its ends, a pair of hollow cylindrical pins extending transversely between the links substantially normal thereto and respectively into opposed pockets therein with their end faces lying substantially parallel to the links and engaging the bottoms of the link pockets and their outer cylindrical surfaces engaging the substantially cylindrical walls thereof, link connecting means between the pins rigidly secured to one of the links, and yielding means associated therewith operative to urge the links toward each other to thereby maintain the end faces of the pins against the bottoms of the pockets.

3. A spring shackle comprising a pair of laterally spaced side links each having a substantially cylindrical pocket adjacent each of its ends, a pair of hollow cylindrical pins extending transversely between the links substantially normal thereto and respectively into opposed pockets therein with their end faces lying substantially parallel to the links and engaging the bottoms of the link pockets and their outer cylindrical surfaces engaging the substantially cylindrical walls thereof, a headed bolt extending through both links between the pins having a shoulder adjacent one end, a nut threaded on said end to maintain the adjacent link in rigid engagement with the shoulder, and yielding means interposed between the head of the bolt and the other link operative to urge said link away from said head and toward the first link.

4. In means adapted to form a connection between two relatively movable elements, hollow cylindrical pins extending in substantial parallelism and lateral alignment respectively through said elements in substantially rigid relation therewith, the cavities in the pins forming oil reservoirs and the ends of the pins respectively projecting axially beyond the end faces of the elements, resilient sealing washers surrounding the pins and contacting said faces, a pair of substantially parallel links disposed outwardly of the washers on opposite sides of the elements having substantially cylindrical flat bottomed pockets adjacent their ends receiving the extremities of the pins, and connecting means for the links comprising a bolt extending through both links having a head at one end and a shoulder adjacent its other end, a nut operative to maintain one link in rigid engagement with the shoulder and a spring between the head and the other link operative to urge said other link away from the head toward the first link to thereby maintain intimate bearing engagement between the bottoms of the pockets and the end faces of the pins and slightly compress the sealing washers between the links and said elements.

5. In means adapted to form a connection between two relatively movable elements, hollow cylindrical pins extending in substantial parallelism and lateral alignment respectively through said elements in substantially rigid relation therewith, the cavities in the pins forming oil reservoirs and the ends of the pins respectively projecting axially beyond the end faces of the elements, a pair of substantially parallel links disposed outwardly of the washers on opposite sides of the elements having substantially cylindrical flat bottomed pockets adjacent their ends receiving the extremities of the pins, a bolt extending through both links having a head at one end and a shoulder adjacent its other end, a nut on the bolt adjacent its shouldered end operative to retain one link in rigid engagement with the shoulder, the other link being slidable on the bolt adjacent its head, yielding means interposed between the bolt head and said other link operative to urge the latter away from the head to thereby maintain intimate bearing engagement between the end faces of the pins and the bottoms of the pockets, and a resilient washer surrounding each pin between the inner face of each link and the outer face of each element and filling the space therebetween to inhibit leakage of oil from the adjacent pocket along the pin.

6. In a spring shackle adapted to form an operative connection between the spring and frame of an automobile, a pair of side links adapted for disposition on opposite sides of the spring each having a cylindrical pocket adjacent one of its ends, a bolt extending through both links headed at one end and reduced in diameter at the other to thereby form a shoulder between its extremities, means associated with the reduced end of the bolt for immovably holding the adjacent link thereon against the shoulder, a compression spring disposed between the head of the bolt and the other link operative to urge the latter along the bolt away from the head, and a cylindrical pin adapted to be rigidly secured in the spring with its ends projecting oppositely therefrom and bottoming in the pockets in the links to thereby hold the links apart against the influence of the spring.

7. In combination with the spring and frame of an automobile, a spring shackle comprising a pair of side links disposed on opposite sides of said elements in spaced relation thereto, each link having a cylindrical pocket adjacent each of its ends, a bolt extending through both links headed at one end and reduced in diameter at the other to thereby form a shoulder between its extremities, one of the links being non-rotatably slidable along the bolt, means associated with the reduced end of the bolt for immovably holding the other link thereon against the shoulder, hollow cylindrical pins respectively extended through the spring and the frame and rigidly secured therein with their ends projecting oppositely therefrom and bottoming in the adjacent pockets in the links, an annular resilient washer surrounding each pin adjacent each link and substantially filling the space between it and the frame or spring, a compression spring interposed between the head of the bolt and the slidable link operative to urge the latter along the bolt away from the head against the adjacent end surfaces of the pins, to draw the fixed link against the opposite end surfaces of the pins and to slightly compress all said washers between the links and said elements.

WILLIAM A. TRYON.